US010906181B2

(12) United States Patent
Murty et al.

(10) Patent No.: US 10,906,181 B2
(45) Date of Patent: Feb. 2, 2021

(54) SYSTEM, DEVICES AND METHODS FOR TELE-OPERATED ROBOTICS

(71) Applicant: ELECTRIC SHEEP ROBOTICS, INC., Pleasanton, CA (US)

(72) Inventors: Naganand Murty, Manteca, CA (US); Gunjit Singh, San Francisco, CA (US); Jarrett Jeffrey Herold, Pleasanton, CA (US)

(73) Assignee: ELECTRIC SHEEP ROBOTICS, INC., Alexandria, VA (US)

( * ) Notice: Subject to any disclaimer, the term of this patent is extended or adjusted under 35 U.S.C. 154(b) by 0 days.

(21) Appl. No.: 16/989,139

(22) Filed: Aug. 10, 2020

(65) Prior Publication Data

US 2020/0368912 A1   Nov. 26, 2020

Related U.S. Application Data

(63) Continuation of application No. PCT/US2020/026846, filed on Apr. 6, 2020.
(Continued)

(51) Int. Cl.
*B25J 9/16* (2006.01)
*B64C 39/02* (2006.01)
(Continued)

(52) U.S. Cl.
CPC ........... *B25J 9/1689* (2013.01); *B25J 9/1676* (2013.01); *B25J 9/1697* (2013.01); *B64C 39/022* (2013.01);
(Continued)

(58) Field of Classification Search
CPC ............ B64C 39/024; B64C 2201/127; B64C 2201/123; B64C 2201/141;
(Continued)

(56) References Cited

U.S. PATENT DOCUMENTS 9,235,763 B2 *   1/2016   Joyce .................... G06K 9/0063
10,322,804 B2 *  6/2019   Maekawa ............... G05D 1/042
(Continued)

OTHER PUBLICATIONS

Ollero et al., Multiple eyes in the skies: architecture and perception issues in the COMETS unmanned air vehicles project, 2005, IEEE, p. 46-57 (Year: 2005).*

(Continued)

*Primary Examiner* — McDieunel Marc
(74) *Attorney, Agent, or Firm* — Morgan, Lewis & Bockius LLP

(57) ABSTRACT

A method to enable autonomous and tele-operation of tele-operated robots for maintenance of a property around known and unknown obstacles may include using an unmanned aerial vehicle for obtaining additional data relating to the property and obstacles within the property and plan a path around the obstacles using data from sensors on-board the tele-operated robot and the aerial image. A method may also provide optimization of total time needed for performing the property maintenance and the labor costs in situations where manual intervention is needed for navigating the tele-operated robot around obstacles on the property or for removing obstacles on the property. Embodiments further include systems and devices practicing the method.

22 Claims, 6 Drawing Sheets

Related U.S. Application Data

(60) Provisional application No. 62/830,447, filed on Apr. 6, 2019.

(51) Int. Cl.
*G06T 7/73* (2017.01)
*G06K 9/00* (2006.01)
*G06Q 10/00* (2012.01)

(52) U.S. Cl.
CPC .......... *B64C 39/024* (2013.01); *G06K 9/0063* (2013.01); *G06Q 10/20* (2013.01); *G06T 7/74* (2017.01); *B64C 2201/127* (2013.01); *B64C 2201/148* (2013.01); *G06T 2207/30261* (2013.01); *G06T 2210/12* (2013.01)

(58) Field of Classification Search
CPC ........ B64C 2201/146; B64C 2201/027; B64C 2201/12; B64C 2201/14; B64C 2201/021; B64C 2201/122; B64C 2201/208; B64C 39/02; B64D 47/08; B64D 1/18; B64D 33/00; G06K 9/0063; G06K 9/2009; G06K 9/66; G06K 9/00771; G06K 9/3233; G05D 1/0094; G05D 1/0022; G05D 1/0038; G05D 1/101; G08G 5/0069; G08G 5/0039; G08G 5/0086; G08G 5/045; G08G 5/0034; G08G 5/025; B60R 1/00; B60R 2300/8093; G01S 19/42; G01S 13/867; G01S 17/894; G06T 2207/10056; G06T 2207/10048; G01J 3/0272; G01N 2021/1793; Y10S 901/01
See application file for complete search history.

(56) References Cited

U.S. PATENT DOCUMENTS

| | | | |
|---|---|---|---|
| 2016/0093124 A1* | 3/2016 | Shi | G05D 1/0016 701/2 |
| 2016/0313736 A1* | 10/2016 | Schultz | G06F 16/5838 |
| 2017/0185849 A1* | 6/2017 | High | G06K 9/66 |
| 2019/0055018 A1* | 2/2019 | Bei | B64C 39/024 |
| 2019/0096058 A1* | 3/2019 | Fryshman | A01M 21/043 |
| 2020/0159252 A1* | 5/2020 | Giuffrida | G01C 15/00 |
| 2020/0255143 A1* | 8/2020 | Liang | H04N 5/23206 |

OTHER PUBLICATIONS

Bibuli et al., The MINOAS project: Marine INspection rObotic Assistant System, 2011, IEEE, p. 1188-1193 (Year: 2011).*

Pinto et al., An autonomous surface-aerial marsupial robotic team for riverine environmental monitoring: Benefiting from coordinated aerial, underwater, and surface level perception, IEEE, p. 2015, IEEE, p. 443-450 (Year: 2015).*

Zhang et al., A survey on multiple unmanned vehicles formation control and coordination: Normal and fault situations, 2013, IEEE, p. 1087-1096 (Year: 2013).*

* cited by examiner

US 10,906,181 B2

SYSTEM, DEVICES AND METHODS FOR TELE-OPERATED ROBOTICS

CROSS REFERENCE TO RELATED APPLICATIONS

This application in a continuation of International Application No. PCT/US20/26846, filed on Apr. 6, 2020 which claims the benefit of priority to U.S. Provisional Application No. 62/830,447, filed on Apr. 6, 2019, the disclosures of both are incorporated herein by reference in their entirety.

TECHNICAL FIELD

The systems, devices and methods disclosed herein are directed to tele-operated robots, and in particular to tele-operated robots used for outdoor property maintenance.

BACKGROUND

Tele-operated robots have generally been used in hazardous situations such as bomb defusal, inspection of nuclear or chemical plants, or other situations where an operator may be exposed to hazardous environment. Another application of tele-operated robots is in robot assisted surgeries where the robots augment the capabilities of a surgeon and reduce the size of incision.

One untapped application for tele-operated robots is in various processes occurring during outdoor property maintenance such as navigation, lawn maintenance, landscaping, fumigation, pest control, spraying of surfaces, etc.

SUMMARY

In an aspect of the present disclosure, a method for operating a tele-operated robot for maintenance of a property includes obtaining an aerial image of the property using an unmanned aerial vehicle (UAV). The aerial image is transmitted to a control center communicatively coupled to the UAV and the tele-operated robot. The control center includes a processor. An area of interest within the property where property maintenance is to be performed based on the aerial image is determined at the control center. Based on the aerial image, the area of interest is classified at the control center as a first area that is autonomously navigable by the tele-operated robot and a second area that is not autonomously navigable by the tele-operated robot. A schedule of operation of the tele-operated robot for performing the property maintenance in the area of interest is determined at the control center based on a relative size of the first area and the second area. The schedule is configured to minimize labor hours and total time spent in performing the property maintenance.

In another aspect of the present disclosure, a method for operating a tele-operated robot for maintenance of a property includes obtaining, during an operation of the tele-operated robot for maintenance of the property, data relating to an obstacle in an operating path of the tele-operated robot using a sensor of the tele-operated robot. Upon detection of the obstacle, it is determined, at a control center, whether a path avoiding the obstacle can be estimated based on the data relating to the obstacle. The control center includes a processor and is communicatively coupled to the tele-operated robot. Upon a determination that a path avoiding the obstacle cannot be estimated, a flight of an UAV is initiated at by the control center. The flight path of the UAV is configured to obtain an aerial image of an area surrounding the obstacle for enabling estimation of the path avoiding the obstacle while minimizing deviation from the operating path of the tele-operated robot.

In yet another aspect of the present disclosure, a method for operating a tele-operated robot for maintenance of a property includes obtaining, during an autonomous operation of the tele-operated robot for maintenance of the property, data relating to an obstacle in an operating path of the tele-operated robot using a sensor of the tele-operated robot. At a control center, it is determined whether one or both of a position and a classification of the obstacle is previously known. The control center includes a processor communicatively coupled to the tele-operated robot. At the control center, upon a determination that the position and the classification of the obstacle is not previously known, it is determined whether an alternate operating path that preserves an unmaintained area of the property while avoiding the obstacle can be estimated based on the data relating to the obstacle. At the control center, upon a determination that the alternate operating path can be estimated, the alternate operating path is estimated. The autonomous operation of the tele-operated robot is continued using the alternate operating path.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Human-in-the-loop based supervision is the process of using humans as a backstop to partially automated robots or tools equipped with electromechanical actuators. This is known more commonly as conditional automation. In automotive parlance, this is also called Level 3 automation. In this the tasks performed run the gamut of tasks that need next to no human supervision, to tasks that need a material percentage of human supervision.

The system involves providing the remote operator with data captured from sensors (force, temperature, pressure etc.) and video cameras installed on the on-site robot and surrounding implements, and providing them with an interface to relay commands back to the actuators on the on-site robot via a telemetry data link.

Property maintenance involves several tasks that are perceptually complex but relatively low on the scale of dexterity necessary. In this scenario the maximum value addition of human labor comes from the ability to provide a layer of remote management over several machines, when dealing with unforeseen situations, or situations in which there is not yet high confidence in the robot's decision making capabilities. Moreover, it is relatively easier to automate a machine given that we have a backstop for dealing with unforeseen contingencies rather than climb the asymptote of ever rarer cases for which specific decision paths need to be applied.

For many tasks, this is the only possible way to achieve cost efficiency—pair a robot with some fractional amount of human oversight, often in a cheaper remote location with lower costs of labor. This allows lots of industries in property maintenance (included but not limited to lawn care, tree care, neighborhood security, parcel delivery, home cleaning etc).

Figure 1:
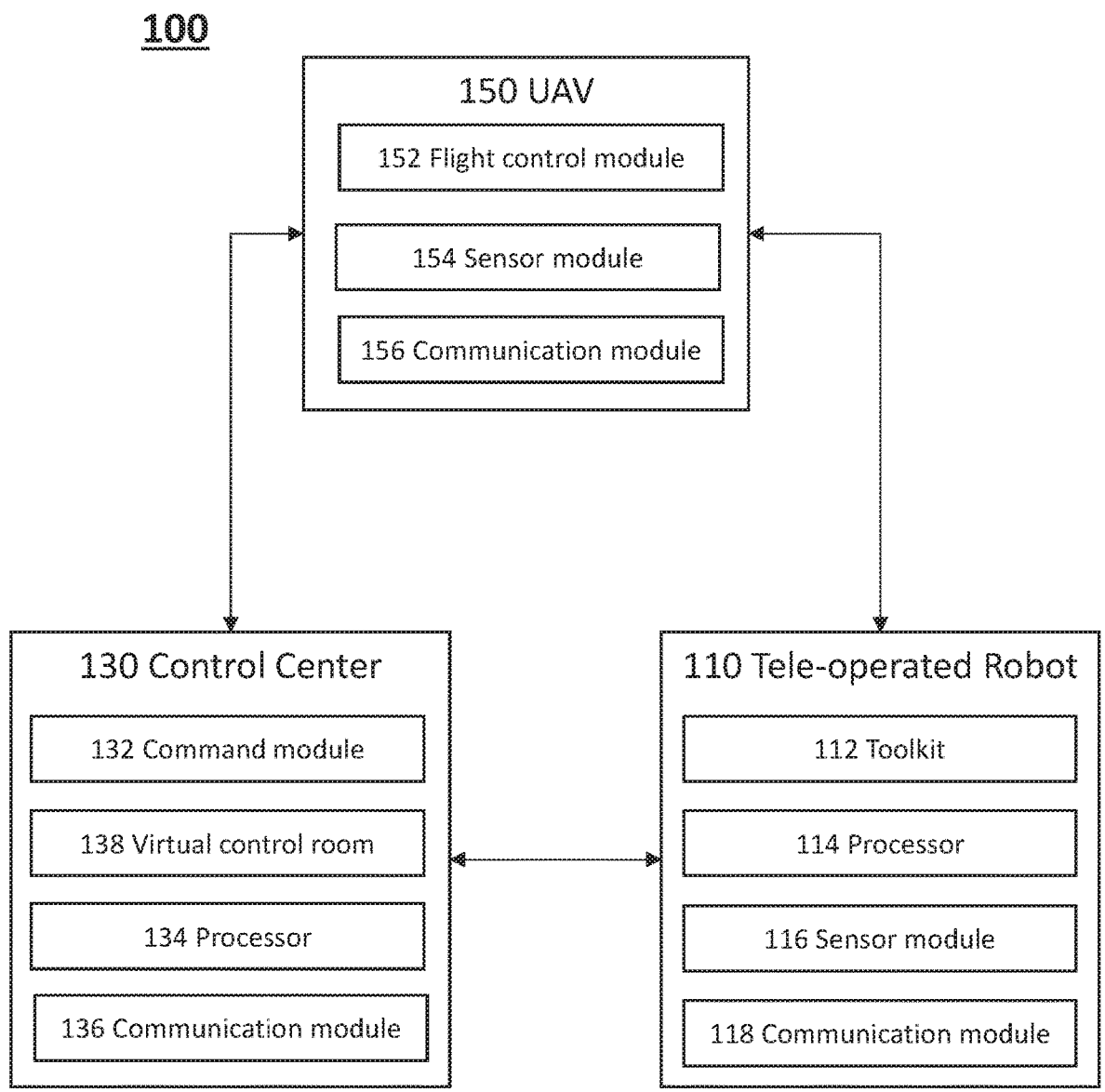
FIG. 1 shows a block diagram of a tele-operated robotic system, in accordance with some embodiments of the present disclosure.

FIG. 1 shows a block diagram of a tele-operated robotic system, in accordance with some embodiments of the present disclosure. In an implementation, the tele-operated robotic system 100 includes a tele-operated robot 110 and a control center 130. In some implementations, the tele-operated robotic system 100 may additionally include an unmanned aerial vehicle (UAV, interchangeably referred to herein as a drone).

A. Tele-Operated Robot

The term "tele-operated robot" as used herein refers to a robot capable of being operated or supervised locally or remotely by a human user as well as being capable of functioning autonomously. It will be understood that functioning autonomously does not necessarily mean functioning fully autonomously without any human supervision or support. In other words, functioning autonomously as used herein does not refer to automation similar to automotive Level 5 automation. Thus, a tele-operated robot in accordance with an implementation of the present disclosure can function autonomously; however, a human user can override the autonomous control of the tele-operated robot and control it locally or remotely.

Referring to FIG. 1, a tele-operated robot 110 may include a toolkit 112, a processor 114, a sensor module 116 and a communication module 118. While not shown in the Figures, in some embodiments, the tele-operated robot may optionally include augmented reality (AR) or virtual reality (VR) markers, shapes or contour lines, or paint to enable it to be easily identified by a UAV flying overhead using basic machine vision approaches, e.g., to enable the UAV to distinguish the tele-operated robot 110 from low lying obstacles, or ground terrain during operation.

The toolkit 112 may include one or more tools or actuators enabling the tele-operated robot 110 to perform its functions. For example, the toolkit of a tele-operated robotic lawn mower may include one or more set of blades structured and positioned for cutting grass on the ground within a property being maintained. The toolkit of a tele-operated robotic lawn mower may also include a suction motor for sucking up cut grass and other debris, a container or a basket for collecting the sucked up grass and other debris, a hose for connecting the suction motor to the container or basket, as well as other tools generally suitable for a cutting and/or shaping grass on the ground.

In the context of tele-operated robots for property maintenance, the tele-operated robots may include, but are not limited to, lawn mower; hedge trimmer; string trimmer; tiller; cultivator; weed puller; pole saw; leaf blower; chain saw; hedge shears; pressure washer wand for washing surfaces; fumigator for spraying pesticides, insecticides, herbicides, anti-viral sprays, anti-bacterial sprays; a UV wand for disinfecting surfaces and frequently touched surfaces; or any other tools suitable for landscaping and/or property maintenance. The toolkit for the tele-operated robots may, therefore, vary depending on the primary function of the robot. In some embodiments, some or all of the tools within the toolkit for the tele-operated robot may be replaceable by a different tool such that the primary function of the tele-operated robot is changed.

The processor 114 may include one or more processors such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

In some embodiments, the processor 114 processes data received from the sensor module 116 and/or the communication module 118 to navigate and operate the tele-operated robot 110. In some embodiments, the processor 114 processes the commands and controls received from communication module 118 to navigate and operate the tele-operated robot 110.

In some embodiments, the processor 114 may control the operation of the one or more actuators. For example, in some embodiments, the processor 114 may change the operating speed at which the actuators perform the task based on latency of communication (e.g., navigation or operational commands) being received from a control center. In some embodiments, the processor 114 may calculate the minimum reaction time needed to tele-supervise/tele-operate in a given obstacle density (and a given view), and calculate a minimum stopping distance (both for motion/any kind of dextrous manipulation) under the constraints of this reaction time.

The sensor module 116 may include one or more sensors that enable autonomous operation of the tele-operated robot or enable the local or remote operator or supervisor of the tele-operated robot to sense an environment surrounding the tele-operated robot. Examples of various sensors that may be included in a tele-operated robot for property maintenance include, but are not limited to, camera, stereo camera LIDAR, RADAR, ultrasound sensors, GPS positioning system, IR sensors, spectral sensors covering various portions of the light spectrum, and gyroscope(s). In addition, the sensor module 116 may also include sensors that enable the tele-operated robot to detect its performance. For example, a lawn mower may include a sensor for detecting a height of the grass to be cut as well as height of the grass that has been cut. In some embodiments, the lawn mower may include a sensor for detecting the quality of grass using, for example, a spectral analysis of the grass. As another example, a sensor may detect coverage area and spread of a gas/liquid that has been sprayed over a given surface.

The sensor module 116 may obtain data relating to an environment surrounding the tele-operated robot 110, e.g., in the form of optical images, LIDAR data, and/or ultrasound data. In some embodiments, the sensor module 116 may additionally or alternately obtain information about the (absolute or relative) position or orientation of the tele-operated robot 110.

In some embodiments, the data obtained by the sensor module 116 is used by the processor 114 to operate the tele-operated robot 110 autonomously. In some embodiments, the data obtained by the sensor module 116 is used by the processor 114 to augment commands received by the tele-operated robot 110 from a human operator. In some embodiments, the data obtained by the sensor module 116 is used by the processor 114 to additionally or alternately provide a feedback the human operator about the environment and/or operation of the tele-operated robot 110.

The communication module 118 may include a receiver and a transmitter configured to wirelessly communicate with other components of the system 100. The transmitter and/or the receiver of the communication module 118 may utilize any presently available communication protocols such as, for example, 4G, 5G, WiMax, WiFi, or a combination thereof to communicate with the other components of the system 100 through a network, e.g., Internet. In some embodiments, the communication module 118 may be configured to utilize multiple communication protocols for improving reliability of communication. For example, in an embodiment, the tele-operated robot 110 may communicate with the UAV 150 using WiFi while communicating with the control center 130 using 4G or 5G communication protocols. It will be understood that the communication protocols used by the communication module 118 are not limited to those presently available, and as communication technology advances, other protocols may be used in the future. Thus, the scope of the present disclosure is not limited to presently available communication protocols, but also includes any communication protocols that may be available in the future.

For example, the communication module 118 enables the tele-operated robot 110 to communicate with the control center 130 or the UAV 150. In some embodiments, the communication module 118 can transmit sensor data from the tele-operated robot 110 to the control center 130, and receive command and control data from the control center 130. In some embodiments, the communication module 118 may additionally or alternately receive aerial image information from the UAV 150.

B. Control Center

The term "control center" as used herein refers to a component of the tele-operated robotic system that provides control and commands for the tele-operated robot. Thus, the control center may provide navigation and/or operational commands provided by a human operator or supervisor to the tele-operated robot. In some embodiments, the control center may additionally or alternately provide navigation and/or operational commands based on analysis of the data received by the control center (either from the tele-operated robot or from other components of the system such as the UAV).

Referring to FIG. 1, the control center 130 may include a command module 132, a processor 134, a communication module 136, and optionally a virtual control room 138.

The command module 132 may include an input terminal such as, for example, a laptop, a console, a desktop, a tablet, a mobile computing device, or a mobile phone. The input terminal may be provided with input devices such as, for example, a key board, a joystick, a mouse, a microphone, a game controller or a combination thereof to enable a human user to input commands to the input terminal.

The commands input by the human user are processed by the input terminal and transmitted through the control center 130 to the tele-operated robot 110. The commands sent from the control center 130 to the tele-operated robot 110 may cause the tele-operated robot 110 to move around an area of interest along a certain path, change a mode of operation, change of speed of movement, change a speed of operation, In some embodiments, the tele-operated robot 110 may continue to operate autonomously if no command is sent through the control center 130.

The processor 134 may include one or more processors such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

In some embodiments, the processor 134 may be part of the input terminal of the command module 132. In some embodiments, the processor 134 may be separate from the input terminal of the command module 132, and dedicated for processing the data received by the control center 130 from other components of the system 100 such as, for example, the tele-operated robot 110 and/or the UAV 150.

In some embodiments, the control center 130 is implemented such that the processor 134 resides onboard the tele-operated robot 110 while the command module 132 is provided at a remote site. In some embodiments, the processor resides onboard a UAV 150 while the command module 132 is provided at a remote site. In some embodiments, the processor 134 and the command module 132 are provided onboard the tele-operated robot 110 and an additional identical (or different) command module 132 is provided at a remote site. Other permutations are contemplated within the scope of the present disclosure.

In some embodiments, the processor 134 may process the data received from the tele-operated robot 110 and/or the UAV 150 and generate commands for navigation and/or operation of the tele-operated robot 110. In some embodiments, the commands generated by the processor 134 may further include commands issued by a human user through the command module 132.

The communication module 136 may include a receiver and a transmitter configured to wirelessly communicate with other components of the system 100. The transmitter and/or the receiver of the communication module 136 may utilize any presently available communication protocols such as, for example, LTE, 5G, WiMax, WiFi, etc. to communicate with the other components of the system 100 through a network, e.g., Internet. It will be understood that the communication protocols used by the communication module 136 are not limited to those presently available, and as communication technology advances, other protocols may be used in the future. Thus, the scope of the present disclosure is not limited to presently available communication protocols, but also includes any communication protocols that may be available in the future.

For example, the communication module 136 enables the control center 130 to communicate with the tele-operated robot 110 or the UAV 150. In some embodiments, the communication module 136 can transmit commands and controls from the control center 130 to the tele-operated robot 110, and receive data from the tele-operated robot 110 and/or other components of the system 100 such as the UAV 150.

The virtual control room 138 may include output devices such as, for example, a display and a speaker to enable the human user to visualize and/or listen to the environment surrounding the tele-operated robot 110 being operated or supervised through the control center 130.

In some embodiments, a map of the property may be loaded into a virtual space where the human supervisor/operator may enter the commands for the tele-operated robot. These commands may include but are not limited to, actuation instructions, navigation instructions, etc. These commands may generate the necessary changes in the virtual space and may be iteratively or continuously altered till the desired output is created. Then, the sequence is transmitted to the tele-operated robot in the real world where it then creates the desired task. In other words, the sequence of commands provided in the virtual space act as a blueprint for actions performed by the tele-operated robot. Advantageously, such a blueprint may be helpful in reducing latency or the need for real-time transfer of high-bandwidth data. For example, in some embodiments, rather than transmitting data relating to an entire scene, only data relating to a change in the scene may be transmitted, which can then be rendered appropriately in the virtual space.

In some embodiments, the virtual control room 138 may include a dome screen display for a more immersive experience for the human supervisor/operator. For example, the human supervisor/operator may be mounted on a chair in front of a hemispherical dome when direct 1:1 tele-operation is needed. In some embodiments, the position of the human supervisor/operator is calculated such that the perspective is intuitive and aids in creating perspective. In some embodiments, the chair is provided with a force feedback and a joystick for situations where a tactile feedback relayed to the tele-operated robot is important for efficacy. In some binaural audio is provided to the human supervisor/operator in order to replay the aspects of auditory feedback.

It will be understood that while the discussion that follows may use a tele-operated lawn mower, interchangeably referred to herein as a robotic lawn mower, as an example of how various methods according to the present disclosure operate, the discussion is not meant limit the scope of the present disclosure. One of ordinary skill in the art, upon an understanding of the present disclosure, would find the discussion to be equally applicable and or readily modifiable for other types of tele-operated robots.

C. Unmanned Aerial Vehicle

Referring back to FIG. 1, the system 100 may optionally include an unmanned aerial vehicle (also interchangeably referred to herein as a UAV or a drone) 150. In some embodiments, the UAV 150 may include a flight control module 152, a sensor module 154 and a communication module 156.

The UAV 150 may be any unmanned aerial vehicle that is capable of autonomous flight, semi-autonomous flight or remotely controlled flight. A UAV may include, but is not limited to a drone, a helicopter, a multi-copter, a hexa-copter, a octocopter, a balloon, a blimp, or the like or a mixture of a drone and an airplane, capable of vertical take-off and landing (VTOL).

In some embodiments, the UAV may be equipped with a GPS (global positioning system) controller in order to determine its current location and plan a path to a target location. In some embodiments, the UAV may be operated with electrical power, rechargeable batteries and/or with a combustion engine. In embodiments in which the UAV is operated with electrical power, it may be generated using fuel cells.

The flight control module 152 is primarily responsible for controlling the flight of the UAV including, for example, landing, take-off, navigation, aerial obstacle avoidance, and so forth. The flight control module 152 may include a controller including a processor.

In some embodiments, the processor may additionally or optionally process data obtained by the sensors of the sensor module 154 before transmitting to the control center 130 and/or the tele-operated robot 110.

The sensor module 154 may include one or more sensors that enable autonomous operation of the UAV. In addition, the sensor module 154 includes one or more sensors that enable collection of data relating to the property and augment the data available to the tele-operated robot 110 from the sensor module 116. For example, the sensor module 154 may include, without limitation, a depth camera, video camera, stereo camera, LIDAR, RADAR, ultrasound sensors, GPS positioning system, IR sensors, spectral sensors covering various portions of the light spectrum, and gyroscope(s).

In some embodiments, sensor parameters such as position (of the UAV), zoom, or area of focus in real-time to obtain a clearer view of the environment around the tele-operated robot 110 for the human supervisor/operator or the autonomous navigation processor at the tele-operated robot 110 or the control center 130. For example, if the tele-operated robot were to go under a tree canopy, the UAV would trail behind at an angle, e.g., at a 45° angle, or adjust its hovering height to be just above the tele-operated robot 110 while avoiding the trees. Alternately, or additionally, the zoom level, e.g., of the optical sensors, can be increased or decreased to obtain a clearer image of a localized part of the environment surrounding the tele-operated robot 110 to enhance tele-operation or autonomous navigation.

Thus, in some embodiments, the sensors of the sensor module 154 are selected and configured to augment or substitute the sensors onboard the tele-operated robot 110 that enable navigation of the tele-operated robot 110.

In some embodiments, the sensor module 154 may include sensors for detecting specific structures, artifacts or defects in the environment surrounding the tele-operated robot 110. For example, the sensor module 154 may include a spectral sensor configured to detect specific wavelengths emitted by weeds to enable the tele-operated robot 110 to detect weeds and plan an optimal operating path for weed control. As another example, the spectral sensor may be configured to detect patches of uncut or differently treated grass using images taken at different portions of the light spectrum.

The communication module 156 may include a wireless transmitter and receiver to communicate with the control center 130 and/or the tele-operated robot 110 or any other components of system 100. Via the communication module 156, the UAV 150 may receive instructions from the control center 130 including, for example, coordinates of the property being maintained and a flight path for an overflight over the property.

D. Method for Obstacle Avoidance

As discussed herein, tele-operated robots, such as the tele-operated robot 110, may be used for performing property maintenance. For example, in an embodiment, a tele-operated robot such as a tele-operated lawn mower may be used for mowing grass in a stretch of land, e.g., of a golf course. Such a stretch of land may include known and unknown objects which may be obstacles for the tele-operated lawn mower when mowing the lawn. Disclosed herein are methods and systems for avoiding the obstacles that may obstruct a motion of a tele-operated robot.

Figure 2:
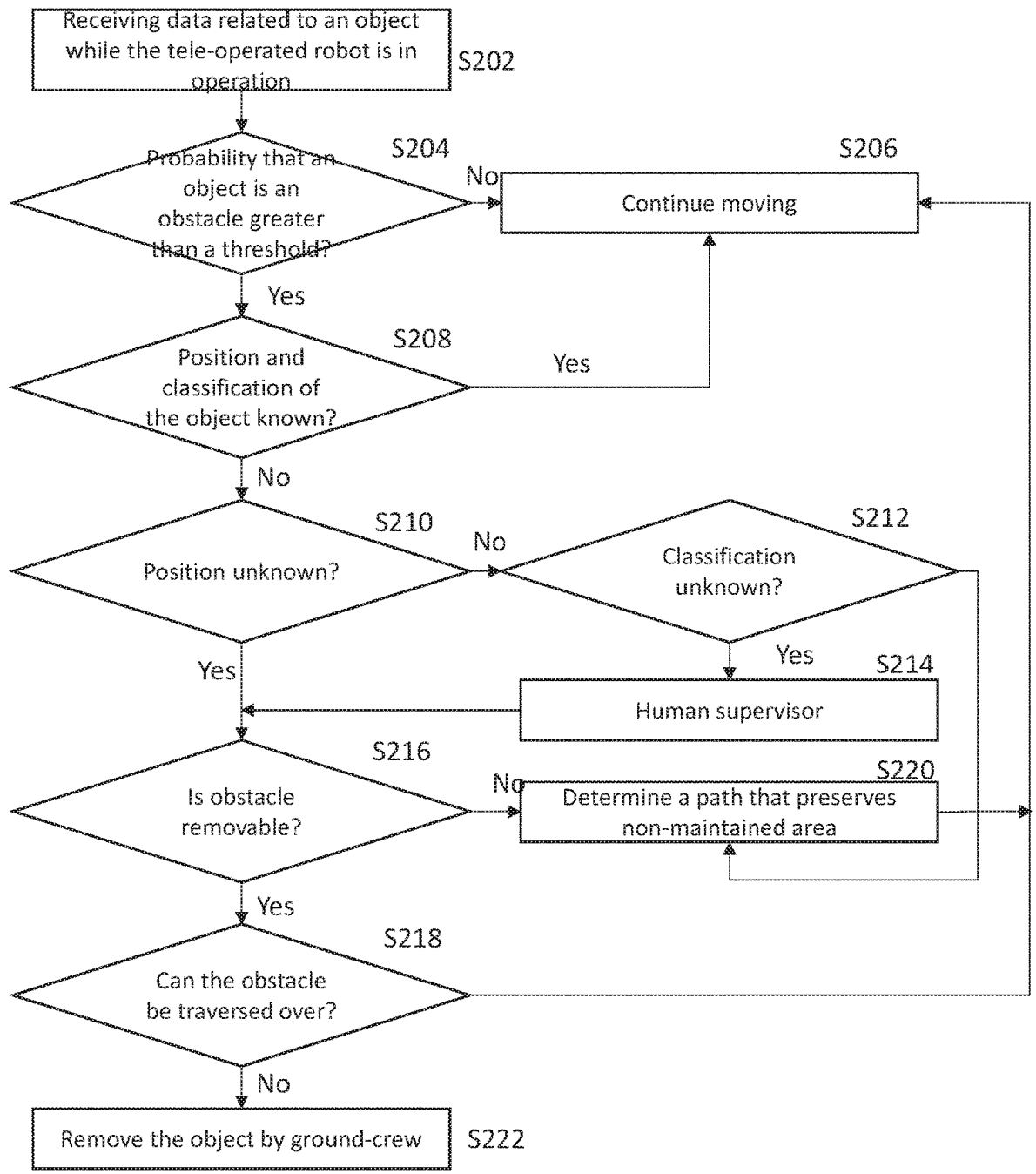
FIG. 2 illustrates a flow chart for a method for obstacle avoidance in accordance with an embodiment of the present disclosure.

FIG. 2 illustrates a flow chart for a method for obstacle avoidance in accordance with an embodiment of the present disclosure. In an implementation, a method for operating a tele-operated robot for maintenance of a property such as a robotic lawn mower includes obtaining, at S202, during an autonomous operation of the tele-operated robot for maintenance of the property, data relating to an object in an operating path of the tele-operated robot using a sensor of the tele-operated robot. In some embodiments, the operating path may be predetermined based on a prior survey of the property. In some embodiments, the operating path may be determined based on real-time analysis of an environment surrounding the tele-operated robot. The real-time analysis may be performed based on data obtained from sensors onboard the tele-operated robot in some embodiments.

At S204, based on the data relating to the object, at a control center, it is determined whether a probability that the object is an obstacle is greater than a threshold. The determination of whether the probability that the object is an obstacle is based on factors such as, for example, a detected shape and size of the object. The control center includes a processor communicatively coupled to the tele-operated robot. For example, in some embodiments, the control center may be the control center 130 of the system 100. In some embodiments, the control center may be included within the tele-operated robot.

If it is determined that the probability that the object is an obstacle is not greater than the threshold, at S206, the control center causes the tele-operated robot to continue operating in the operating path.

If it is determined that the probability that the object is an obstacle is greater than the threshold, at S208, it is determined whether one or both of a position and a classification of the obstacle is previously known. An obstacle may be classified as, for example, movable, immovable, modifiable, non-modifiable, traversable, non-traversable, new, or old. The position may be considered as an absolute position relative to earth coordinates, or a relative position with respect to a pre-identified landmark on the property.

If it is determined that either the position or the classification of the obstacle is unknown, at S210, it is determined, at the control center, whether a position of the obstacle is unknown. Upon determination that the position of the obstacle is known, at S212, it is determined, at the control center, whether the classification of the object is unknown. If it is determined that the classification of the object is known, at S220, an alternate operating path that preserves the non-maintained area is determined at the control center and the control center causes the tele-operated robot to continue, at S206, operating in the alternate operating path.

On the other hand, if it is determined that the position of the obstacle is known but the classification of the obstacle is unknown, the control center, at S214, initiates a process for inspection of the obstacle to enable a determination of the classification of the obstacle. In some embodiments, the process includes causing a human supervisor to be deployed to determine the classification of the obstacle. In some embodiments, the human supervisor may further determine, at S216, whether the obstacle is removable from the property.

In some embodiments, the process for inspection of the obstacle includes causing a UAV to fly over the property in a flight path that is configured to determine the classification of the obstacle. In some embodiments, the UAV flight path is configured to obtain an aerial image comprising a three-dimensional (3D) geometrically corrected composite map of the property. The 3D geometrically corrected composite map is then transmitted to the control center or the tele-operated robot to enable estimation of an alternate operating path that preserves the non-maintained area.

Referring back to FIG. 2, if it is determined that the position of the obstacle is known, it is determined whether the classification of the obstacle is known, and at S216, it is determined, at the control center, whether the obstacle is removable from the property based on the data relating to the object (now determined to be an obstacle).

If it is determined that the obstacle is not removable from the property, at S220, an alternate operating path that preserves the non-maintained area is determined at the control center and the control center causes the tele-operated robot to continue, at S206, operating in the alternate operating path.

In contrast, if it is determined that the obstacle is removable, it is first determined at the control center, at S218, whether the obstacle can be traversed over. If it is determined that the obstacle can be traversed over, the control center causes the tele-operated robot to continue, at S206, operating in the alternate operating path. And if it is determined that the obstacle cannot be traversed over, at control center, at S222, a process for manual removal of the obstacle is initiated. In some embodiments, the process may include causing a ground-crew to be deployed for removing the obstacle.

In some embodiments, if it is determined that the obstacle is not removable, and it cannot be traversed over, the control center may cause the tele-operated robot to cede navigation and operation control to a human operator. In some embodiments, the human operator may be available on-site at the property (e.g., a member of the ground-crew). In some embodiments, the human operator may operate the tele-operated robot remotely from a remote site.

E. Drone-based Tele-operation and Autonomous Navigation

In certain situations, depending on the terrain of a property, and the number of obstacles within a given area of the property, it may difficult to autonomously navigate and operate the tele-operated robot using only the sensors onboard the tele-operated robot. In such situations, a human supervisor or operator may navigate and/or operate the tele-operated robot. However, even in such situations, it may sometimes be difficult for the human supervisor or operator to estimate an operating path for the tele-operated robot because inherent limitations in the data obtained from sensors onboard the tele-operated robot. In such situations, it may be helpful to obtain a perspective view such as, for example, an aerial view from a drone for the human supervisor or operator to suitably navigating and operating the tele-operated robot.

Advantageously, by appropriately selecting the sensors for the UAV, it may be augment or substitute the sensors onboard the tele-operated robot that enable navigation of the tele-operated robot. For example, with an appropriate set of sensors on the UAV, navigation sensors (e.g., LIDAR) onboard the tele-operated robot may be completely eliminated, thereby reducing the cost of the tele-operated robots substantially. Moreover, as further detailed herein, it may be possible, in certain situations, to share a UAV between several tele-operated robots, thereby reducing the equipment cost even further.

Figure 3A:
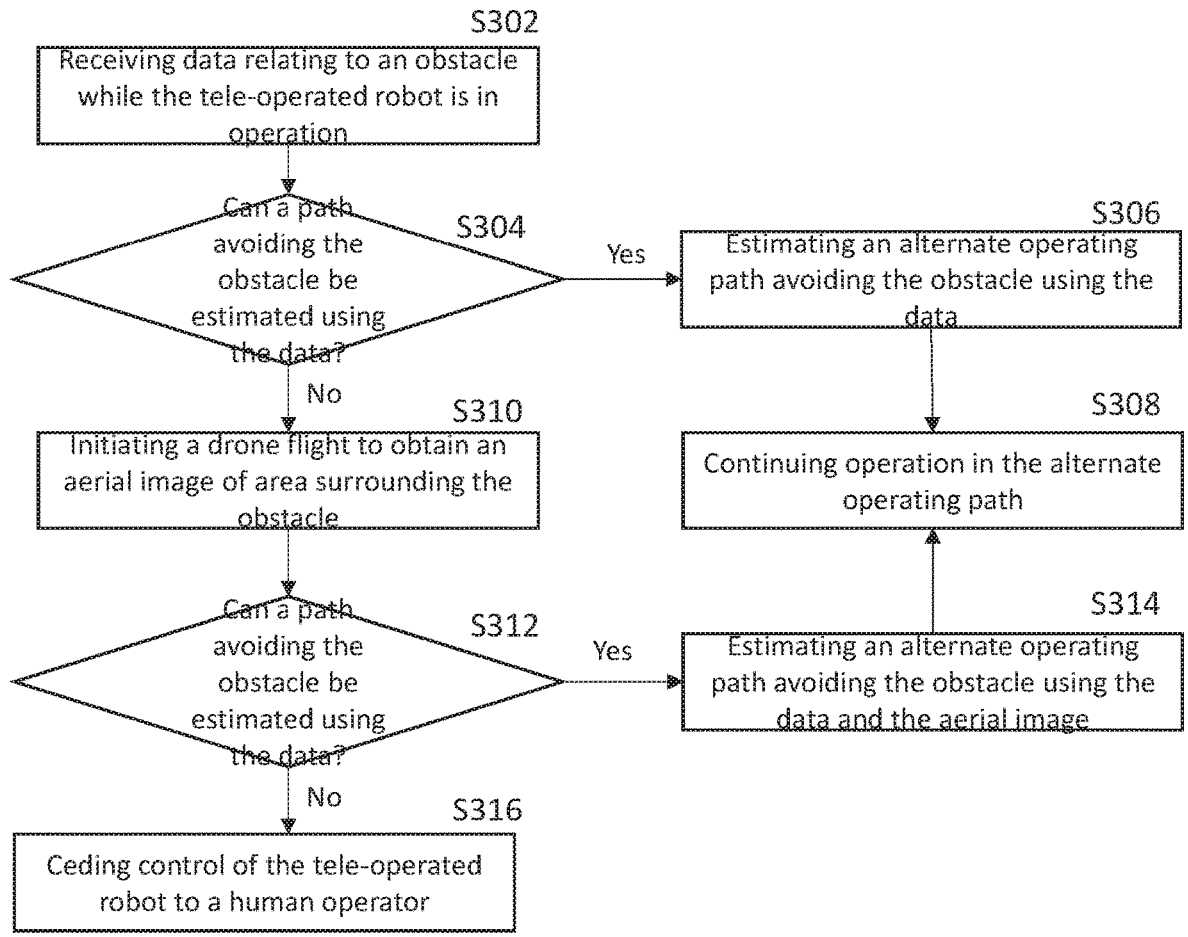
FIGS. 3A, 3B and 3C show flow charts for a method of operating a tele-operated robot for property maintenance, in accordance with an embodiment of the present disclosure.
Figure 3B:
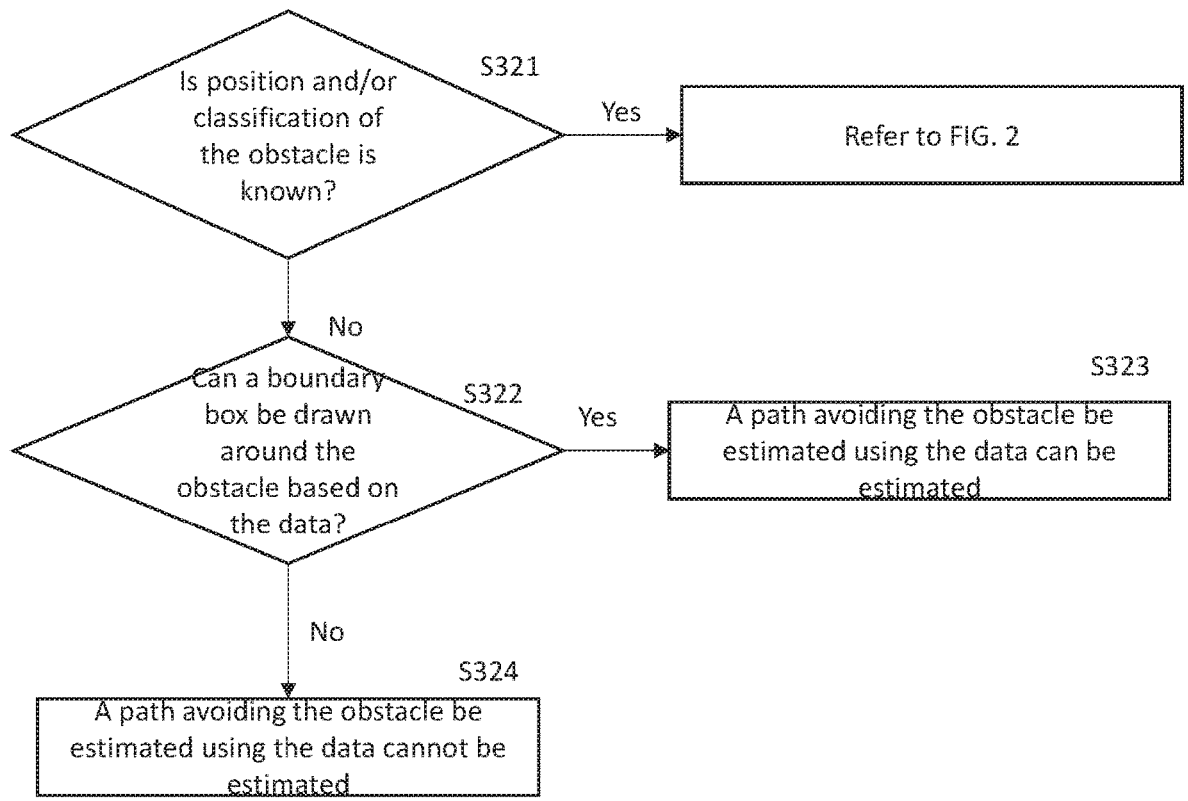
Figure 3C:
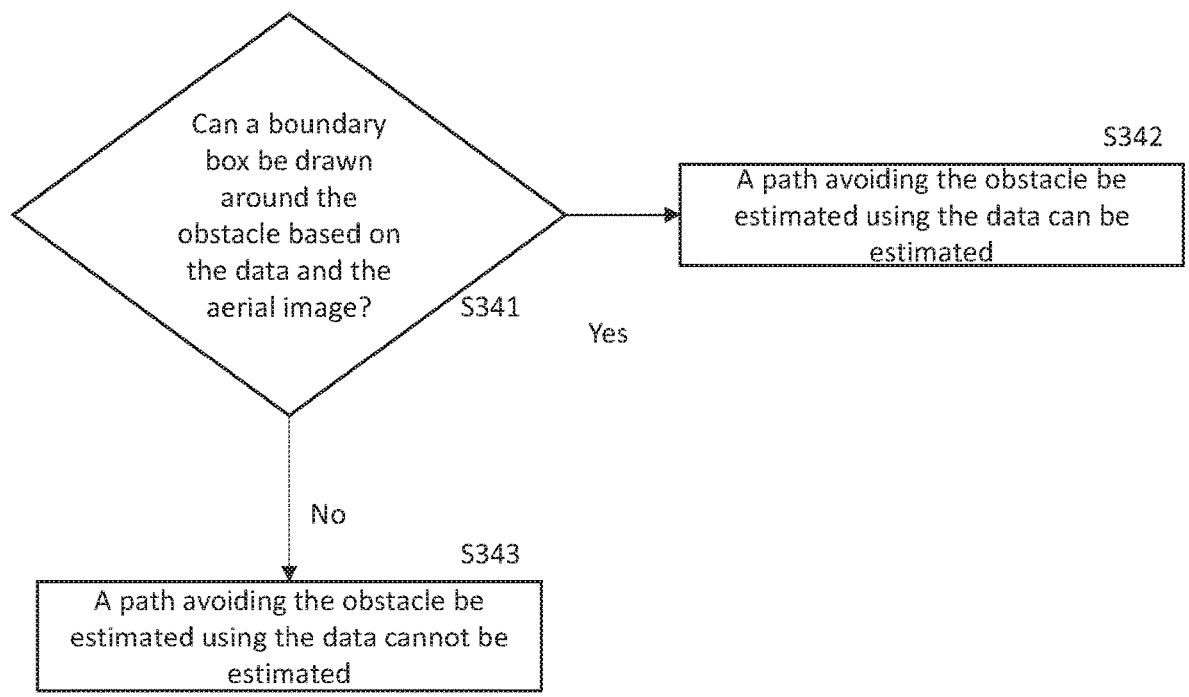

FIGS. 3A, 3B and 3C show flow charts for a method of operating a tele-operated robot for property maintenance, in accordance with an embodiment of the present disclosure. In an implementation, the method may be implemented at a control center communicatively coupled to the tele-operated robot and a UAV. The control center includes a processor communicatively coupled to the tele-operated robot. For example, in some embodiments, the control center may be the control center 130 of the system 100. In some embodiments, the control center may be included within the tele-operated robot.

In some embodiments, the method includes, at S302, receiving, at the control center, data relating to an obstacle detected in an operating path of the tele-operated robot during an operation of the tele-operated robot for maintenance of the property. In some embodiments the data relating to the obstacle is obtained using sensors onboard the tele-operated robot. The data relating to the obstacle may include, but is not limited to, optical images, LIDAR data, ultrasound data, spectral data and infrared (IR) data.

At S304, at the control center, it is determined whether a path avoiding the obstacle can be estimated based on the data relating to the obstacle. In some embodiments, whether a path avoiding the obstacle can be estimated based on the data relating to the obstacle is determined by, at S321, determining, at the control center, whether one or both of a position and a classification of the obstacle is previously known. At S322, upon a determination that the position and the classification of the obstacle is not previously known, it is determined, at the control center, whether a boundary box surrounding the obstacle can be estimated based on the data relating to the obstacle. At S323, upon a determination that a boundary box can be estimated based on the data relating to the obstacle, determining that the path avoiding the obstacle can be estimated based on the data relating to the obstacle. At S324, upon a determination that a boundary box cannot be estimated, determining, at the control center that the path avoiding the obstacle cannot be planned based on the data relating to the obstacle.

If it is determined that the path avoiding the obstacle can be estimated based on the data relating to the obstacle, at S306, an alternate operating path minimizing a deviation from the operating path is estimated using the data relating to the obstacle, and at S308, the control center causes the tele-operated robot to continue operating in the alternate path.

On the other hand, if it is determined that the path avoiding the obstacle cannot be estimated based on the data relating to the obstacle, at S310, the control center initiates a flight of an unmanned aerial vehicle (UAV). The flight path of the UAV is configured to obtain an aerial image of an area surrounding the obstacle for enabling estimation of the path avoiding the obstacle while minimizing deviation from the operating path of the tele-operated robot. In some embodiments, the aerial image may include one or more of an optical image, LIDAR data, or ultrasound sensor data.

At S312, it is determined, at the control center, whether a path avoiding the obstacle can be estimated using the data relating to the obstacle and the aerial image. In some embodiments, whether a path avoiding the obstacle can be estimated based on the data relating to the obstacle and the aerial image is determined by, determining, at S341, at the control center, whether a boundary box surrounding the obstacle can be estimated based on the data relating to the obstacle and the aerial image. At S342, upon a determination that a boundary box can be estimated based on the data relating to the obstacle and the aerial image, determining that the path avoiding the obstacle can be estimated based on the data relating to the obstacle. At S343, upon a determination that a boundary box cannot be estimated, determining, at the control center that the path avoiding the obstacle cannot be planned based on the data relating to the obstacle.

If it is determined that the path avoiding the obstacle can be estimated based on the data relating to the obstacle, at S314, an alternate operating path minimizing a deviation from the operating path is estimated using the data relating to the obstacle and the aerial image and at S308, the control center causes the tele-operated robot to continue operating in the alternate path.

On the other hand, if it is determined that the path avoiding the obstacle cannot be estimated based on the data relating to the obstacle and the aerial image, at S316, the control center causes the tele-operated robot to cede control to a human supervisor or operator.

In some embodiments, the UAV may be configured to hover above the tele-operated robot at a certain height and/or maintain a certain distance from the tele-operated robot. In some embodiments, the UAV is tethered to the tele-operated robot. In such embodiments, the tether may provide power to the UAV from a power source (e.g., a battery) onboard the tele-operated robot.

In some embodiments, the tele-operating robot may including a landing pad where the UAV rests. Upon initiation the flight by the control center, the UAV may take off from the landing pad and return back upon obtaining the required aerial images.

In some embodiments, the landing pad may include induction charging ports to enable the UAV to replenish its battery between consecutive flights.

In some embodiments, the UAV may be communicatively coupled to a second tele-operated robot performing property maintenance at a nearby property, and may be utilized by (i.e., shared with) the second tele-operated robot when a present tele-operated robot does not need aerial images for operation and/or navigation. Advantageously, such sharing reduces the number of drones needed within a given locality, thereby reducing capital costs.

F. LIDAR-Based Tele-Operation and Navigation

In some embodiments, instead of an aerial image, point cloud of the LIDAR provided on the tele-operated robot is provided to the control center (and consequently may be provided to the human supervisor or operator). Advantageously, using onboard LIDAR eliminates the need for the UAV, and also requires substantially less bandwidth since LIDAR point cloud is substantially less data intensive than optical images obtained by the UAV. Thus, the remote operation at lower latencies may be possible.

G. Scheduling Operation of the Tele-Operated Robot and Ground-Crew

When the property being maintained includes a difficult terrain or a multitude of obstacles, a human supervisor/operator and/or a ground-crew may be needed to support the tele-operated robot. In such situations, it is important to minimize the human labor hours and total time spent in performing the property maintenance for optimizing the costs. Thus, an aspect of the present disclosure include a method of operating a tele-operated robot for maintenance of a property while minimizing human labor hours and total time spent.

Figure 4:
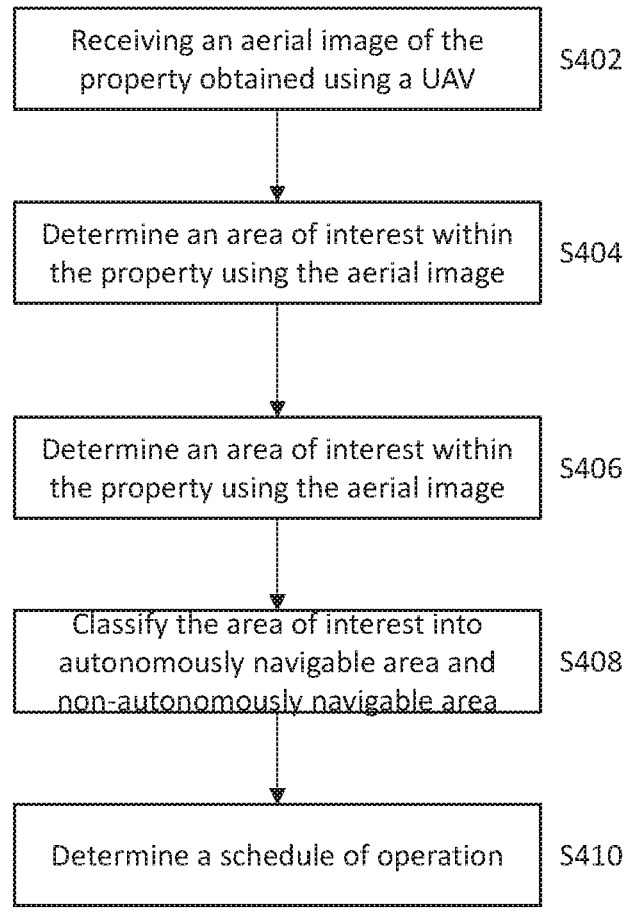
FIG. 4 shows a flow chart for a method of operating a tele-operated robot for maintenance of a property in accordance with an embodiment of the present disclosure.

FIG. 4 shows a flow chart for a method of operating a tele-operated robot for maintenance of a property in accordance with an embodiment of the present disclosure.

In an implementation, the method may include, at 402, receiving at a control center, an aerial image of the property obtained using a UAV. The control center includes a processor communicatively coupled to the tele-operated robot. For example, in some embodiments, the control center may be the control center 130 of the system 100. In some embodiments, the control center may be included within the tele-operated robot.

In some embodiments, the aerial image comprises at least one of an optical image, LIDAR data, or ultrasound sensor data. In some embodiments, the aerial image comprises a three-dimensional (3D) geometrically corrected composite map of the property.

At S404, an area of interest within the property where property maintenance is to be performed is determined at the control center based on the aerial image.

At S406, based on the aerial image, the area of interest is classified, at the control center, as a first area that is autonomously navigable by the tele-operated robot and a second area that is not autonomously navigable by the tele-operated robot. In some embodiments, the second area is further classified into a third area that is navigable by remote operation of the tele-operated robot and a fourth area that requires on-site intervention by a ground-crew member.

In some embodiments, the on-site intervention by a ground-crew member may include modifying an environment in the fourth area to render the fourth area into a first area or a third area by: removing an object from the fourth area, smoothing of a terrain in a portion of the fourth area, moving an object within the fourth area to a different location, spraying a ultra-violet visible paint in portions of the fourth area, broadening an area from where an obstacle is removed from within the fourth area, broadening a margin of operation near a known obstacle within the fourth area, flagging a portion of the fourth area for repair, flagging a portion of the fourth area for accessory tasks, or a combination thereof.

In some embodiments, classifying the area of interest may include determining an operating path for the tele-operated robot within the area of interest, and determining one or more of: a number of obstacles inhibiting an operation of the tele-operated robot within the area of interest, a density of the obstacles per unit area within the area of interest, size of the obstacles within the area of interest, a type of the obstacles, and location of the obstacles within the area of interest relative to each other based on the aerial image.

It will be understood that the first, third and fourth areas are do not refer to disjoint portions of a map or an enclosed connected space, but rather to plurality of disjoint non-connected spaces within the property. Thus, in some embodiments, the area of interest may include multiple non-connected first areas, multiple non-connected third areas and multiple non-connected fourth areas.

At S408, at the control center, a schedule of operation of the tele-operated robot for performing the property maintenance in the area of interest is determined based on a relative size of the first and second areas. The schedule is configured to minimize labor hours and total time spent in performing the property maintenance. It will be understood that the schedule is not restricted to a time of the day. For example, the schedule may include performing the autonomous property maintenance during night hours while any tasks needing ground crew or human supervisor/operator may be scheduled during the day (or at night depending on the time zone where the human supervisor/operator is stationed.

In some embodiments, the schedule may include a time of operation in operation in different and an allowance for time needed for transferring the tele-operated robot between similarly classified areas. For example, an allowance for time may be provided for transferring the tele-operated robot from a first first area to a second first area where the first first area and the second first area are not connected and may be separated by, for example, a fourth area.

In some embodiments, the schedule of operation includes a time of operation in different areas as well as an operating path for the tele-operated robot in each of the different areas including coordinates of the starting and ending points of the operating path. For example, the schedule may include coordinates of the first area of the tele-operated robot and coordinates of the starting an ending points of the operating path for autonomously performing property maintenance within the first area.

In some embodiments, the operating path for the tele-operated robot in the given area may be generated to minimize the distance between similarly classified areas. For example, the schedule may include a first operating path for autonomously performing the maintenance of the property in the first area, and a second operating path for performing the maintenance of the property in the second area by remote operation of the tele-operated robot by a human operator. In such embodiments, the schedule is optimized by minimizing the time needed for transferring the tele-operated robot from the first first area to the second first area. This may be accomplished by, for example, determining a shortest path between the first first area and the second first area, and generating operating paths for performing the maintenance of the first first area and the second first area such that the operating path for the first first area ends at one end of the shortest path between the first first area and the second first area.

In some embodiments, the schedule is further configured to minimize interference with a normal work schedule of the ground-crew member.

H. Pre-Recording a Map of a Property

In some embodiments, pre-work overflight of the work site with an unmanned aerial vehicle is performed to record data of interest (e.g., obstacles, boundaries, sensor readings, etc.). The recorded data of interest may be paired with a once per site mapping by the ground vehicle recording. A three-dimensional (3D) map of the property may thus, be created by fusing LIDAR, depth camera, ultrasonic data with aerial data. This 3D map may be stored for quick retrieval and navigation when performing the task within that property.

One of the challenges of operating a property maintenance tool, e.g., a lawn mower or a landscaping tool, autonomously is accurate localization near obstacles (trees, bushes, walls et al.). While Real-time Kinenatic GPS (RTK GPS) positioning provides for tolerances of error, those tolerances those may be insufficient especially given multipath error. In such situations, the UAV may be fitted with a base station to maintain line of sight to the sky, and line of sight and proximity to the tool for more accuracy in positioning.

In some embodiments, the UAV is flown over the area on a path similar to the operating path followed by the tele-operated robot, except at constant elevation above the ground. During this pre-performance check, data from several sensors—including but not limited to, visual data, LIDAR data, GPS (RTK and non RTK) data is recorded for the property, and known, immovable obstacles are classified and mapped. The processing perform this classification may be conducted via algorithms running either on the drone itself, or, given the necessity of conserving weight for airborne vehicles, at the control center.

Additionally, or alternately, in some embodiments, a UAV GPS reading near an obstacle with line-of-sight to both tool and satellite might be obtained when the tele-operated robot is being operated in manual mode (i.e., operated by a human user either remotely or on-site). These readings may function as ground truth for map/path of property upon which other decisions are to be based.

I. Clauses

Clause 1. A method for operating a tele-operated robot for maintenance of a property, the method comprising: receiving, at a control center, an aerial image of the property obtained using an unmanned aerial vehicle (UAV), the control center being communicatively coupled to the UAV and the tele-operated robot, and comprising a processor; determining, at the control center, an area of interest within the property where property maintenance is to be performed based on the aerial image; classifying, at the control center, based on the aerial image, the area of interest as a first area that is autonomously navigable by the tele-operated robot and a second area that is not autonomously navigable by the tele-operated robot; determining, at the control center, a schedule of operation of the tele-operated robot for performing the property maintenance in the area of interest based on a relative size of the first area and the second area, the schedule being configured to minimize labor hours and total time spent in performing the property maintenance; and performing the property maintenance in accordance with the determined schedule of operation.

Clause 2. The method of Clause 1, wherein the second area is further classified into a third area that is navigable by remote operation of the tele-operated robot and a fourth area that requires on-site intervention by a ground-crew member.

Clause 3. The method of Clause 2, wherein the determining the schedule is further configured to minimize interference with a normal work schedule of the ground-crew member.

Clause 4. The method of Clause 2, wherein the on-site intervention by a ground-crew member comprises modifying an environment in the fourth area to render the fourth area into a first area or a third area by: removing an object from the fourth area, smoothing of a terrain in a portion of the fourth area, moving an object within the fourth area to a different location, spraying a ultra-violet visible paint in portions of the fourth area, broadening an area from where an obstacle is removed from within the fourth area, broadening a margin of operation near a known obstacle within the fourth area, flagging a portion of the fourth area for repair, flagging a portion of the fourth area for accessory tasks, or a combination thereof.

Clause 5. The method of Clause 1, further comprising: transmitting, from the control center, coordinates of the first area to the tele-operated robot to enable the tele-operated robot to autonomously perform the property maintenance in the first area.

Clause 6. The method of Clause 1, wherein the aerial image comprises at least one of an optical image, LIDAR data, or ultrasound sensor data.

Clause 7. The method of Clause 1, wherein classifying the area of interest comprises: determining an operating path for the tele-operated robot within the area of interest; and determining one or more of: a number of obstacles inhibiting an operation of the tele-operated robot within the area of interest, a density of the obstacles per unit area within the area of interest, size of the obstacles within the area of interest, a type of the obstacles, and location of the obstacles within the area of interest relative to each other based on the aerial image.

Clause 8. The method of Clause 1, further comprising determining, at the control center, based on the aerial image, a first operating path for autonomously performing the maintenance of the property in the first area, and a second operating path for performing the maintenance of the property in the second area by remote operation of the tele-operated robot by a human operator.

Clause 9. A method of operating a tele-operated robot for maintenance of a property, the method comprising: receiving, at a control center, during an operation of the tele-operated robot for maintenance of the property, data relating to an obstacle detected in an operating path of the tele-operated robot using a sensor of the tele-operated robot, the control center comprising a processor communicatively coupled to the tele-operated robot; determining, at the control center, whether a path avoiding the obstacle can be estimated based on the data relating to the obstacle; initiating, by the control center, upon a determination that a path avoiding the obstacle cannot be estimated, a flight of an unmanned aerial vehicle (UAV), a flight path of the UAV being configured to obtain an aerial image of an area surrounding the obstacle for enabling estimation of the path avoiding the obstacle while minimizing deviation from the operating path of the tele-operated robot.

Clause 10. The method of Clause 9, wherein the aerial image comprises at least one of an optical image, LIDAR data, or ultrasound sensor data.

Clause 11. The method of Clause 9, determining whether a path avoiding the obstacle can be estimated comprises: determining, at the control center, whether one or both of a position and a classification of the obstacle is previously known; determining, at the control center, upon a determination that the position and the classification of the obstacle is not previously known, whether a boundary box surrounding the obstacle can be estimated based on the data relating to the obstacle; determining, upon a determination that a boundary box can be estimated based on the data relating to the obstacle, that the path avoiding the obstacle can be estimated based on the data relating to the obstacle; and determining, at the control center, upon a determination that a boundary box cannot be estimated based on the data relating to the obstacle, that the path avoiding the obstacle cannot be planned based on the data relating to the obstacle.

Clause 12. The method of Clause 11, further comprising: estimating, at the control center, upon determination that a path avoiding the obstacle can be estimated, an alternate operating path minimizing a deviation from the operating path.

Clause 13. The method of Clause 11, further comprising continuing, upon determination of the alternate operating path, an autonomous operation of the tele-operated robot using the alternate operating path.

Clause 14. The method of Clause 9, further comprising: determining, at the control center, whether a boundary box can be estimated based on the data relating to the obstacle and the aerial image; determining, upon a determination that a boundary box can be estimated based on the data relating to the obstacle and the aerial image, that the path avoiding the obstacle can be estimated; and determining, at the control center, upon a determination that a boundary box cannot be estimated based on data relating to the obstacle and the aerial image, that the path avoiding the obstacle cannot be estimated and ceding control of the tele-operated robot to a human remote operator.

Clause 15. The method of Clause 14, further comprising: estimating, at the control center, upon determination that a path avoiding the obstacle can be estimated, an alternate operating path minimizing a deviation from the operating path.

Clause 16. The method of Clause 14, further comprising continuing, upon determination of the alternate operating path, an autonomous operation of the tele-operated robot using the alternate operating path.

Clause 17. The method of Clause 9, wherein the UAV is tethered to the tele-operated robot.

Clause 18. The method of Clause 9, wherein the aerial image comprises a three-dimensional (3D) geometrically corrected composite map of the property.

Clause 19. The method of Clause 18, wherein the tele-operated robot comprises a receiver, a robot processor and a memory, and the method further comprises: transmitting the 3D geometrically corrected composite map to the tele-operated robot; and estimating, by the robot processor, a position and a distance of the tele-operated robot relative to fixed obstacles on the property in real time based on the 3D geometrically corrected composite map.

Clause 20. A method of operating a tele-operated robot for maintenance of a property, the method comprising: obtaining, during an autonomous operation of the tele-operated robot for maintenance of the property, data relating to an obstacle in an operating path of the tele-operated robot using a sensor of the tele-operated robot; determining, at a control center, whether one or both of a position and a classification of the obstacle is previously known, the control center comprising a processor communicatively coupled to the tele-operated robot; determining, at the control center, upon a determination that the position and the classification of the obstacle is not previously known, whether an alternate operating path that preserves an unmaintained area of the property while avoiding the obstacle can be estimated based on the data relating to the obstacle; estimating, at the control center, upon a determination that the alternate operating path can be estimated, the alternate operating path; and continuing the autonomous operation of the tele-operated robot using the alternate operating path.

Clause 21. The method of Clause 20, further comprising: determining, at the control center, upon a determination that the alternate operating path cannot be planned, whether the obstacle is removable; and initiating, at the control center, upon a determination that the obstacle is removable, a process for manual removal of the obstacle.

Clause 22. The method of Clause 20, further comprising: ceding, at the control center, upon a determination that the alternate operating path cannot be estimated based on data relating to the obstacle, control of the tele-operated robot to a human remote operator.

Clause 23. A tele-operated robot for maintenance of a property, comprising: a toolkit including one or more actuators configured to perform property maintenance; a sensor module including sensors configured to sense an environment surrounding the tele-operated robot; and a processor coupled to a non-transitory memory having instructions thereon, the instructions causing the processor to: receive, during an operation of the tele-operated robot for maintenance of the property, data relating to an obstacle detected in an operating path of the tele-operated robot using a sensor of the tele-operated robot, the control center comprising a processor communicatively coupled to the tele-operated robot; determine whether a path avoiding the obstacle can be estimated based on the data relating to the obstacle; and initiate, upon a determination that a path avoiding the obstacle cannot be estimated, a flight of an unmanned aerial vehicle (UAV), a flight path of the UAV being configured to obtain an aerial image of an area surrounding the obstacle for enabling estimation of the path avoiding the obstacle while minimizing deviation from the operating path of the tele-operated robot.

Clause 24. The tele-operated robot of Clause 23, wherein the aerial image comprises at least one of an optical image, LIDAR data, or ultrasound sensor data.

Clause 25. The tele-operated robot of Clause 23, wherein determining whether a path avoiding the obstacle can be estimated comprises: determining whether one or both of a position and a classification of the obstacle is previously known; determining upon a determination that the position and the classification of the obstacle is not previously known, whether a boundary box surrounding the obstacle can be estimated based on the data relating to the obstacle; determining, upon a determination that a boundary box can be estimated based on the data relating to the obstacle, that the path avoiding the obstacle can be estimated based on the data relating to the obstacle; and determining, upon a determination that a boundary box cannot be estimated based on the data relating to the obstacle, that the path avoiding the obstacle cannot be planned based on the data relating to the obstacle.

Clause 26. The tele-operated robot of Clause 25, wherein the instructions further cause the processor to: estimate, upon determination that a path avoiding the obstacle can be estimated, an alternate operating path minimizing a deviation from the operating path.

Clause 27. The tele-operated robot of Clause 25, wherein the instructions further cause the processor to continue, upon determination of the alternate operating path, an autonomous operation of the tele-operated robot using the alternate operating path.

Clause 28. The tele-operated robot of Clause 23, wherein the instructions further cause the processor to: determine whether a boundary box can be estimated based on the data relating to the obstacle and the aerial image; determine, upon a determination that a boundary box can be estimated based on the data relating to the obstacle and the aerial image, that the path avoiding the obstacle can be estimated; and determine, at the control center, upon a determination that a boundary box cannot be estimated based on data relating to the obstacle and the aerial image, that the path avoiding the obstacle cannot be estimated and ceding control of the tele-operated robot to a human remote operator.

Clause 29. The tele-operated robot of Clause 28, wherein the instructions further cause the processor to: estimate, at the control center, upon determination that a path avoiding the obstacle can be estimated, an alternate operating path minimizing a deviation from the operating path.

Clause 30. The tele-operated robot of Clause 28, wherein the instructions further cause the processor to continue, upon determination of the alternate operating path, an autonomous operation of the tele-operated robot using the alternate operating path.

Clause 31. The tele-operated robot of Clause 23, wherein the UAV is tethered to the tele-operated robot.

Clause 32. The tele-operated robot of Clause 23, wherein the aerial image comprises a three-dimensional (3D) geometrically corrected composite map of the property.

Clause 33. The tele-operated robot of Clause 32, wherein the instructions further cause the processor to: transmit the 3D geometrically corrected composite map to the tele-operated robot; and estimate a position and a distance of the tele-operated robot relative to fixed obstacles on the property in real time based on the 3D geometrically corrected composite map.

Clause 34. A tele-operated robot for maintenance of a property, comprising: a toolkit including one or more actuators configured to perform property maintenance; a sensor module including sensors configured to sense an environment surrounding the tele-operated robot; and a non-transitory memory coupled to a processor, the non-transitory memory having instructions thereon, the instructions causing the processor to: receive an aerial image of the property obtained using an unmanned aerial vehicle (UAV), the control center being communicatively coupled to the UAV and the tele-operated robot, and comprising a processor; determine an area of interest within the property where property maintenance is to be performed based on the aerial image; classify based on the aerial image, the area of interest as a first area that is autonomously navigable by the tele-operated robot and a second area that is not autonomously navigable by the tele-operated robot; determine a schedule of operation of the tele-operated robot for performing the property maintenance in the area of interest based on a relative size of the first area and the second area, the schedule being configured to minimize labor hours and total time spent in performing the property maintenance; and perform the property maintenance in accordance with the determined schedule of operation.

Clause 35. The tele-operated robot of Clause 34, wherein the second area is further classified into a third area that is navigable by remote operation of the tele-operated robot and a fourth area that requires on-site intervention by a ground-crew member.

Clause 36. The tele-operated robot of Clause 35, wherein the determining the schedule is further configured to minimize interference with a normal work schedule of the ground-crew member.

Clause 37. The tele-operated robot of Clause 35, wherein the on-site intervention by a ground-crew member comprises modifying an environment in the fourth area to render the fourth area into a first area or a third area by: removing an object from the fourth area, smoothing of a terrain in a portion of the fourth area, moving an object within the fourth area to a different location, spraying a ultra-violet visible paint in portions of the fourth area, broadening an area from where an obstacle is removed from within the fourth area, broadening a margin of operation near a known obstacle within the fourth area, flagging a portion of the fourth area for repair, flagging a portion of the fourth area for accessory tasks, or a combination thereof.

Clause 38. The tele-operated robot of Clause 34, wherein the instructions further cause the processor to: transmit coordinates of the first area to the tele-operated robot to enable the tele-operated robot to autonomously perform the property maintenance in the first area.

Clause 39. The tele-operated robot of Clause 34, wherein the aerial image comprises at least one of an optical image, LIDAR data, or ultrasound sensor data.

Clause 40. The tele-operated robot of Clause 34, wherein classifying the area of interest comprises: determining an operating path for the tele-operated robot within the area of interest; and determining one or more of: a number of obstacles inhibiting an operation of the tele-operated robot within the area of interest, a density of the obstacles per unit area within the area of interest, size of the obstacles within the area of interest, a type of the obstacles, and location of the obstacles within the area of interest relative to each other based on the aerial image.

Clause 41. The tele-operated robot of Clause 34, wherein the instructions further cause the processor to determine, based on the aerial image, a first operating path for autonomously performing the maintenance of the property in the first area, and a second operating path for performing the maintenance of the property in the second area by remote operation of the tele-operated robot by a human operator.

Clause 42. A tele-operated robot for maintenance of a property, comprising:

a toolkit including one or more actuators configured to perform property maintenance; a sensor module including sensors configured to sense an environment surrounding the tele-operated robot; and a non-transitory memory coupled to a processor, the non-transitory memory having instructions thereon, the instructions causing the processor to: obtain, during an autonomous operation of the tele-operated robot for maintenance of the property, data relating to an obstacle in an operating path of the tele-operated robot using a sensor of the tele-operated robot; determine whether one or both of a position and a classification of the obstacle is previously known, the control center comprising a processor communicatively coupled to the tele-operated robot; determine, upon a determination that the position and the classification of the obstacle is not previously known, whether an alternate operating path that preserves an unmaintained area of the property while avoiding the obstacle can be estimated based on the data relating to the obstacle; estimate, upon a determination that the alternate operating path can be estimated, the alternate operating path; and continue the autonomous operation of the tele-operated robot using the alternate operating path.

Clause 43. The tele-operated robot of Clause 42, wherein the instructions further cause the processor to: determine, at the control center, upon a determination that the alternate operating path cannot be planned, whether the obstacle is removable; and initiate, at the control center, upon a determination that the obstacle is removable, a process for manual removal of the obstacle.

Clause 44. The tele-operated robot of Clause 42, wherein the instructions further cause the processor to: cede, at the control center, upon a determination that the alternate operating path cannot be estimated based on data relating to the obstacle, control of the tele-operated robot to a human remote operator.

J. Further Considerations

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The singular forms "a," "an," and "the" include plural referents unless the context clearly dictates otherwise. Thus, for example, reference to "a plunger component" includes reference to one or more plunger components, and reference to "the magnet" includes reference to one or more magnets.

In one or more aspects, the terms "about," "substantially," and "approximately" may provide an industry-accepted tolerance for their corresponding terms and/or relativity between items, such as from less than one percent to five percent.

As used herein, the term "substantially" refers to the complete or nearly complete extent or degree of an action, characteristic, property, state, structure, item, or result.

It is to be understood that a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.5 to 10 cm" should be interpreted to include not only the explicitly recited values of about 0.5 cm to about 10.0 cm, but also include individual values and sub-ranges within the indicated range. Thus, included in this numerical range are individual values such as 2, 5, and 7, and sub-ranges such as from 2 to 8, 4 to 6, etc. This same principle applies to ranges reciting only one numerical value. Furthermore, such an interpretation should apply regardless of the breadth of the range or the characteristics being described.

Unless otherwise defined, all technical and scientific terms used herein have the same meaning as commonly understood to one of ordinary skill in the art to which this disclosure belongs. Although any methods, devices and materials similar or equivalent to those described herein can be used in the practice or testing of the disclosure, representative methods, devices, and materials are described below.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Many modifications may be made to this configuration without departing from the scope or spirit of the claimed subject matter.

Although the detailed description contains many specifics, these should not be construed as limiting the scope of the subject technology but merely as illustrating different examples and aspects of the subject technology. It should be appreciated that the scope of the subject technology includes some embodiments not discussed in detail above. Various other modifications, changes and variations may be made in the arrangement, operation and details of the method and apparatus of the subject technology disclosed herein without departing from the scope of the present disclosure. Unless otherwise expressed, reference to an element in the singular is not intended to mean "one and only one" unless explicitly stated, but rather is meant to mean "one or more." In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A method for operating a tele-operated robot for maintenance of a property, the method comprising:

receiving, at a control center, an aerial image of the property obtained using an unmanned aerial vehicle (UAV), the control center being communicatively coupled to the UAV and the tele-operated robot, and comprising a processor;

determining, at the control center, an area of interest within the property where property maintenance is to be performed based on the aerial image;

classifying, at the control center, based on the aerial image, the area of interest as a first area that is autonomously navigable by the tele-operated robot and a second area that is not autonomously navigable by the tele-operated robot;

determining, at the control center, a schedule of operation of the tele-operated robot for performing the property maintenance in the area of interest based on a relative size of the first area and the second area, the schedule being configured to minimize labor hours and total time spent in performing the property maintenance; and performing the property maintenance in accordance with the determined schedule of operation.

2. The method of claim 1, wherein the second area is further classified into a third area that is navigable by remote operation of the tele-operated robot and a fourth area that requires on-site intervention by a ground-crew member.

3. The method of claim 2, wherein the determining the schedule is further configured to minimize interference with a normal work schedule of the ground-crew member.

4. The method of claim 2, wherein the on-site intervention by a ground-crew member comprises modifying an environment in the fourth area to render the fourth area into a first area or a third area by:

removing an object from the fourth area, smoothing of a terrain in a portion of the fourth area, moving an object within the fourth area to a different location, spraying a ultra-violet visible paint in portions of the fourth area, broadening an area from where an obstacle is removed from within the fourth area, broadening a margin of operation near a known obstacle within the fourth area, flagging a portion of the fourth area for repair, flagging a portion of the fourth area for accessory tasks, or a combination thereof.

5. The method of claim 1, further comprising:
transmitting, from the control center, coordinates of the first area to the tele-operated robot to enable the tele-operated robot to autonomously perform the property maintenance in the first area.

6. The method of claim 1, wherein the aerial image comprises at least one of an optical image, LIDAR data, or ultrasound sensor data.

7. The method of claim 1, wherein classifying the area of interest comprises:
determining an operating path for the tele-operated robot within the area of interest; and
determining one or more of:
a number of obstacles inhibiting an operation of the tele-operated robot within the area of interest, a density of the obstacles per unit area within the area of interest, size of the obstacles within the area of interest, a type of the obstacles, and location of the obstacles within the area of interest relative to each other based on the aerial image.

8. The method of claim 1, further comprising determining, at the control center, based on the aerial image, a first operating path for autonomously performing the maintenance of the property in the first area, and a second operating path for performing the maintenance of the property in the second area by remote operation of the tele-operated robot by a human operator.

9. A tele-operated robot for maintenance of a property, comprising:
a toolkit including one or more actuators configured to perform property maintenance;
a sensor module including sensors configured to sense an environment surrounding the tele-operated robot; and
a non-transitory memory coupled to a processor, the non-transitory memory having instructions thereon, the instructions causing the processor to:
receive, during an operation of the tele-operated robot for maintenance of the property, data relating to an obstacle detected in an operating path of the tele-operated robot using a sensor of the tele-operated robot, the control center comprising a processor communicatively coupled to the tele-operated robot; determine whether a path avoiding the obstacle can be estimated based on the data relating to the obstacle; and
initiate, upon a determination that a path avoiding the obstacle cannot be estimated, a flight of an unmanned aerial vehicle (UAV), a flight path of the UAV being configured to obtain an aerial image of an area surrounding the obstacle for enabling estimation of the path avoiding the obstacle while minimizing deviation from the operating path of the tele-operated robot.

10. The tele-operated robot of claim 9, wherein the aerial image comprises at least one of an optical image, LIDAR data, or ultrasound sensor data.

11. The tele-operated robot of claim 9, determining whether a path avoiding the obstacle can be estimated comprises:
determining whether one or both of a position and a classification of the obstacle is previously known;
determining upon a determination that the position and the classification of the obstacle is not previously known, whether a boundary box surrounding the obstacle can be estimated based on the data relating to the obstacle;
determining, upon a determination that a boundary box can be estimated based on the data relating to the obstacle, that the path avoiding the obstacle can be estimated based on the data relating to the obstacle; and
determining, upon a determination that a boundary box cannot be estimated based on the data relating to the obstacle, that the path avoiding the obstacle cannot be planned based on the data relating to the obstacle.

12. The tele-operated robot of claim 11, wherein the instructions further cause the processor to:
estimate, upon determination that a path avoiding the obstacle can be estimated, an alternate operating path minimizing a deviation from the operating path.

13. The tele-operated robot of claim 11, wherein the instructions further cause the processor to continue, upon determination of the alternate operating path, an autonomous operation of the tele-operated robot using the alternate operating path.

14. The tele-operated robot of claim 9, wherein the instructions further cause the processor to: determine whether a boundary box can be estimated based on the data relating to the obstacle and the aerial image;
determine, upon a determination that a boundary box can be estimated based on the data relating to the obstacle and the aerial image, that the path avoiding the obstacle can be estimated; and determine, at the control center, upon a determination that a boundary box cannot be estimated based on data relating to the obstacle and the aerial image, that the path avoiding the obstacle cannot be estimated and ceding control of the tele-operated robot to a human remote operator.

15. The tele-operated robot of claim 14, wherein the instructions further cause the processor to:
estimating, at the control center, upon determination that a path avoiding the obstacle can be estimated, an alternate operating path minimizing a deviation from the operating path.

16. The tele-operated robot of claim 14, wherein the instructions further cause the processor to continue, upon determination of the alternate operating path, an autonomous operation of the tele-operated robot using the alternate operating path.

17. The tele-operated robot of claim 9, wherein the UAV is tethered to the tele-operated robot.

18. The tele-operated robot of claim 9, wherein the aerial image comprises a three-dimensional (3D) geometrically corrected composite map of the property.

19. The tele-operated robot of claim 18, wherein the instructions further cause the processor to:
transmit the 3D geometrically corrected composite map to the tele-operated robot; and
estimate a position and a distance of the tele-operated robot relative to fixed obstacles on the property in real time based on the 3D geometrically corrected composite map.

20. A method of operating a tele-operated robot for maintenance of a property, the method comprising:
obtaining, during an autonomous operation of the tele-operated robot for maintenance of the property, data relating to an obstacle in an operating path of the tele-operated robot using a sensor of the tele-operated robot;
determining, at a control center, whether one or both of a position and a classification of the obstacle is previously known, the control center comprising a processor communicatively coupled to the tele-operated robot;
determining, at the control center, upon a determination that the position and the classification of the obstacle is not previously known, whether an alternate operating path that preserves an unmaintained area of the property while avoiding the obstacle can be estimated based on the data relating to the obstacle;
estimating, at the control center, upon a determination that the alternate operating path can be estimated, the alternate operating path; and
continuing the autonomous operation of the tele-operated robot using the alternate operating path.

21. The method of claim 20, further comprising:
determining, at the control center, upon a determination that the alternate operating path cannot be planned, whether the obstacle is removable; and
initiating, at the control center, upon a determination that the obstacle is removable, a process for manual removal of the obstacle.

22. The method of claim 20, further comprising:
ceding, at the control center, upon a determination that the alternate operating path cannot be estimated based on data relating to the obstacle, control of the tele-operated robot to a human remote operator.

* * * * *